US006706107B2

(12) United States Patent
Walker et al.

(10) Patent No.: US 6,706,107 B2
(45) Date of Patent: Mar. 16, 2004

(54) PAINTS AND METHODS OF MAKING SAME

(75) Inventors: Whitney A. Walker, 140 Glass St., Dallas, Dallas County, TX (US) 75207-6904; Richard K. Walker, Temecula, CA (US); Clark A. Higginbotham, IV, Wylie, TX (US); Lisa M. Hahn, Columbus, OH (US)

(73) Assignee: Whitney A. Walker, Dallas, TX (US)

( * ) Notice: Subject to any disclaimer, the term of this patent is extended or adjusted under 35 U.S.C. 154(b) by 101 days.

(21) Appl. No.: 10/074,129

(22) Filed: Feb. 12, 2002

(65) Prior Publication Data

US 2002/0170463 A1 Nov. 21, 2002

Related U.S. Application Data

(60) Provisional application No. 60/282,307, filed on Apr. 5, 2001.

(51) Int. Cl.$^7$ .......................... C09D 189/00; C09D 5/14
(52) U.S. Cl. .............................. 106/156.23; 106/124.2; 106/155.2; 106/15.21; 106/156.1
(58) Field of Search ........................... 106/124.2, 155.2, 106/155.21, 156.1, 156.23

(56) References Cited

U.S. PATENT DOCUMENTS

| 568,419 | A | | 9/1896 | Swink |
| 805,984 | A | | 11/1905 | McMaster |
| 1,241,067 | A | | 9/1917 | West |
| 2,064,387 | A | | 12/1936 | Schwartz |
| 2,584,123 | A | | 2/1952 | Gruenwald |
| 2,880,104 | A | * | 3/1959 | Scholl ..................... 106/126.3 |
| 4,118,247 | A | | 10/1978 | Marchetti |
| 5,482,543 | A | | 1/1996 | Bleve et al. |
| 5,972,093 | A | | 10/1999 | Mosca |
| 6,267,812 | B1 | * | 7/2001 | Lefer et al. ................. 106/487 |

FOREIGN PATENT DOCUMENTS

| DE | 40 24 925 | | 2/1992 |
| DE | 93 17 296 U | | 10/1994 |
| EP | 0960922 A1 | * | 12/1999 |
| JP | 48 093626 A | | 12/1973 |

OTHER PUBLICATIONS

PCT International Search Report in PCT/US02/10590, Jul. 31, 2002.

* cited by examiner

Primary Examiner—Anthony J. Green
(74) Attorney, Agent, or Firm—Fulbright & Jaworski L.L.P.

(57) ABSTRACT

A non-toxic paint and methods for making same are disclosed herein, such paint being comprised of a vehicle, a kaolin slurry and a pigment dispersion. Specifically, the vehicle is comprised of casein protein and potassium sorbate. Such paints are non-toxic and have a substantially long wet-shelf life.

23 Claims, No Drawings

PAINTS AND METHODS OF MAKING SAME

This application claims the benefit of U.S. Provisional Application No. 60/282,307, filed Apr. 5, 2001.

TECHNICAL FIELD OF THE INVENTION

This invention relates to the field of paints generally and, more particularly, to non-toxic paints in either a liquid or semi-liquid form, and methods for their manufacture. Even more particularly, the present invention relates to a liquid non-toxic paint having a substantial wet-shelf-life and methods for making same.

BACKGROUND OF THE INVENTION

Typically, conventional paints have three main components: a binder, a filler and a pigment. Generally, the binder is a synthetic petroleum-based polymer resin with extremely long and complex molecules. During the time when some normal synthetic resin polymerize, solvents, bactericides and surfactants, materials that may be hazardous to human health, are released into the atmosphere. The presence of such materials in the atmosphere has been linked to serious pathological conditions, including tumors, cancer, acute allergies, asthma, bone disorders, and the like. In fact, these diseases may be considered commonplace in the paint industry despite their assured undesirability. Additionally, once formed, it is believed that the paint film may deteriorate over time and produce dusts that may also pose serious health hazards when inhaled. Also, the filler and pigment components may contain substances possibly known to be hazardous to the environment and human health.

Even water-based paints containing acrylic resins, often portrayed in advertising as "non-toxic," are made with solvents, bactericides and other harmful components that may be released into the atmosphere, especially before polymerization occurs. Such components may be insidious and extremely dangerous, despite the fact that they are virtually odorless. Consequently, there is a need for a non-toxic paint that does not contain these undesirable components and does not present problems for humans or the environment.

One form of heretofore known non-toxic paint is referred to as milk paint and is of ancient origins. Milk paint typically utilizes milk protein, known as casein, as a binder rather than a synthetic or petroleum-based binder. Lime and pigments such as earth oxides are typically mixed with the milk protein to form a non-toxic powdered milk paint. These powdered paint compositions can then be mixed with water by the consumer to form a liquid (albeit very grainy) paint possibly suitable for use in a variety of applications.

Requiring the consumer (who is not likely familiar with making homogeneous paint compositions) to be responsible for mixing the powdered milk paint with water is extremely problematic. For example, substantial foaming occurs when the powdered paint is mixed with water. The foaming must be controlled to achieve a suitably homogenous mixture; a feat not easily accomplished by the ordinary consumer. Further, if adequate mixing is not obtained, the resulting shades and textures are usually not repeatable, resulting in the ultimate dissatisfaction of the consumer, especially in situations where the consumer wishes to redecorate over surfaces where milk paints have been applied previously. This problem is exasperated by the fact that powdered milk paints do not offer one-coat coverage because of the rapid deterioration in the viscosity of the paint after mixing, and therefore, many batches of the paint must be mixed to finish even the smallest jobs. Other problems associated with these powdered milk paints are that they are considered a caustic material, and the powders themselves present dusting/inhalation hazards.

Despite their initial environmental attractiveness, another particularly salient drawback associated with milk-based paints is that after mixing with water they have a short wet-shelf-life; typically, three days or less. Some formulas of milk paint may last as long as two to four weeks, but their quality deteriorates over this time, and they become completely unsatisfactory to consumers within a few days after mixing. Thus, in reality, the paint must be discarded within a few days of mixing or opening if not used entirely. Alternatives, such as refrigeration, are unsatisfactory. Thus, it would be desirable if a premixed, non-toxic milk-based paint were available that has a substantially long wet-shelf-life. Furthermore, the quality of such paints should not deteriorate over the long shelf-life. Also, oftentimes, these paints have an undesirable sour-milk scent.

Therefore, there is an unaddressed and long-felt need for non-toxic paints (i.e., paints that contain little or preferably no harmful or hazardous materials, such as materials known to be carcinogens or mutagens). Further, there is a need for such paints to be readily available in a premixed liquid or semi-liquid form so that the paints can be immediately and easily used by consumers. Moreover, such liquid and semi-liquid non-toxic paints should be of the quality that would enable a consumer to obtain a uniform and appealing appearance and texture when using the paints. Additionally, it would be desirable if such paints had a pleasant smell.

SUMMARY OF THE INVENTION

Accordingly, the present invention provides for the manufacture of non-toxic paints that contain little or preferably no hazardous substances such as carcinogens or mutagens typically contained in or released by conventional paints. The present invention also provides non-toxic paints that have a substantially long wet-shelf-life, a stable consistency over time, and that can be purchased easily by consumers in liquid or semi-liquid form similar to conventional liquid paints. The non-toxic paints of the present invention also have the proper rheology, allowing for good brushability and one-coat application possibilities. Consequently, the present invention provides stable liquid or semi-liquid non-toxic paints that cannot only be stored for substantially long periods of time without spoiling, but also will be suitable for successive uses to obtain maximum effectiveness in covering power, texture, adhesion and aging in the finished job.

One feature of the non-toxic paints of the present invention is that the paint has excellent application and texturing qualities, covers well, and adheres to practically all surfaces, with the exception of some metal surfaces.

Another feature of the non-toxic paints of the present invention is that they have a lower pH, and therefore, do not present profound eye or skin irritation hazards as do conventional powdered-milk paints.

One embodiment of the non-toxic paints of the present invention comprises a vehicle (one embodiment of the vehicle comprising potassium sorbate and casein protein); a kaolin slurry; and a pigment dispersion.

One embodiment of a method of manufacturing the non-toxic paint compositions of the present invention includes the steps of: providing a vehicle; providing a kaolin slurry; providing a pigment dispersion; and mixing the vehicle, the kaolin slurry, and the pigment dispersion so as to form a liquid or semi-liquid non-toxic paint.

Other and further objects, features and advantages will be apparent from the following description of some embodiments of the invention.

DETAILED DESCRIPTION OF THE INVENTION

Generally, the non-toxic paints of the present invention are made up of three components: a vehicle, a kaolin slurry and a pigment dispersion. These three components may be made separately and then combined or made concurrently. Either method is suitable to obtain the advantages of the present invention. Although these are three of the components, additional components that are compatible with these three components may be added if desired.

We have found that potassium sorbate may be used successfully to combat the perishable nature of the casein protein and, thereby, provide a substantial shelf-life for the non-toxic paint. The potassium sorbate acts as a preservative for the non-toxic paints. Thus, formation of fungi or molds in the paint that would lead to it being unusable is inhibited. This inhibition effect can be achieved whether the potassium sorbate is added to the vehicle, the kaolin slurry, the pigment dispersion, or all three components individually or after mixing.

The vehicle is the carrier of the pigments and functions much like a binder in conventional paints. The vehicle can either be liquid or semi-liquid, depending on the desired end-use and the amount of liquid used in the vehicle formulation. The vehicle is comprised of two main components: potassium sorbate ($C_6H_7KO_2$) and casein protein. Other components of the vehicle may beneficially include methyl-2-amino-2-propanol-1 ("amp"), water, urea and their equivalents. Those of ordinary skill in the art will be able to determine the suitability of these other components, and may be able to use additional components to obtain a homogeneous vehicle component.

One of the methods of manufacturing the vehicle includes mixing all liquid components, adding the potassium sorbate, sifting in the casein until smooth, adding the amp, mixing all of the components to form a homogenous mixture and then checking the pH of the mixture. Preferably, the pH should range from about 8 to about 9. The following are nonlimiting examples of compositions of and methods useful for making such a vehicle.

Vehicle Composition 18.37% by weight casein protein powder 0.50% by weight potassium sorbate 1.91% by weight amp 76.61% by weight water 2.61% by weight urea Procedure Place liquids (except amp) in container and mix well. Add the potassium sorbate. Sift casein protein powder into vortex until smooth. Add amp and mix well. Adjust the pH to the desired level.

The kaolin slurry component is itself comprised of a main component: kaolin. We have also found it useful to add potassium sorbate to the kaolin slurry. Other components of the kaolin slurry may include a portion of the vehicle, amp, and water. Those of ordinary skill in the art may find that these components may not result in an optimum mixture, and therefore, may substitute or add other components. Such substitutions or additions are contemplated within the scope of the present invention. All of the components are mixed to form a homogenous mixture. The following are nonlimiting examples of compositions of and methods useful for making a kaolin slurry:

Kaolin Slurry Composition 45.14% by weight kaolin 27.03% by weight vehicle 0.50% by weight amp 0.50% by weight potassium sorbate 26.83% by weight water Procedure Place liquids (except amp) in a container and mix well. Sift the kaolin into the vortex and mix until smooth. Add the potassium sorbate and amp. Mix well.

The pigment dispersion component is comprised mainly of a titanium dioxide pigment. Additional components that we have found beneficial to add to the pigment dispersion are a portion of the vehicle, water, and optionally potassium sorbate. Another component that we have found beneficial to add to the pigment dispersion is calcium carbonate. Again, substitutions and additions by those skilled in the art are contemplated within the scope of the present invention. Depending on the color desired, an optional pigment may be added to the pigment dispersion to impart color to the non-toxic paint.

Suitable pigments for the non-toxic paints of the present invention include organic pigments, inorganic pigments, vegetable dyes and other naturally occurring earth pigments. Some specific examples of such suitable pigments include ocher, umber, carbon black, and iron oxide. Most pigments that are suitable for use in conventional paints are also suitable for use in the non-toxic paint compositions of the present invention. If such pigments are considered to contain components that may be harmful to either humans or the environment, it is preferable that a minimal volume be utilized so as to minimize the toxicity of the final paint composition. Those of ordinary skill in the art will recognize the appropriateness of using such pigments to achieve the purposes and advantages of the present invention.

The following are nonlimiting examples of compositions of and methods useful for making a pigment dispersion:

Pigment Dispersion Composition 21.72% by weight vehicle 10.00% by weight water 0.40% by weight potassium sorbate 25.82% by weight calcium carbonate 42.70% by weight titanium dioxide Procedure Place all liquids in a container and mix well at high speed. Add the potassium sorbate to the mixture. Sift in the calcium carbonate and the titanium dioxide into the vortex and mix. Adjust the pH to the desired level.

Notwithstanding the examples above, the pigment does not necessarily have to be a component of the pigment dispersion—it may be added to any single component or to the combined composition of the vehicle, kaolin slurry and pigment dispersion. Adding the pigment to the pigment dispersion, adding the pigment to any other single component, or adding it to the combined composition essentially are equivalent methods of achieving similar color parameters and are, therefore, interchangeable.

One type of additional component that may be added to either the vehicle, the kaolin slurry, the pigment dispersion, or the vehicle/kaolin slurry/pigment dispersion composition is a fragrance. A fragrance may be used to impart a distinctive smell to the paint, to combat any unpleasant odors, or the like. Suitable fragrances include but are not limited to fragrances such as vanilla, cinnamon, other spices, fruit scents, or floral scents. A neutralizer may also be added to combat smells or to create paint with no discernable smell. Another additional component that may be added to any of the individual components or to the vehicle/kaolin slurry/pigment dispersion composition is wax, preferably wax from a natural-origin such as bees wax or vegetable-based wax. As an alternative, a wax coating can be placed on top of a painted surface to obtain a desired texture or appearance. Wax may be useful in obtaining a desired texture, hide, or covering for the paint.

Once the individual components are made, they can be mixed in any order to form the non-toxic paint compositions of the present invention. Preferably, the pigment dispersion is added first, then the vehicle is added second, and the kaolin slurry is added last. However, the components may be added in any order suitable for making the homogeneous non-toxic paint composition. Suitable mixture orders are within the skill of one skilled in the art given the benefit of this disclosure.

Moreover, the percentages of the individual components in the overall composition may vary greatly depending on the desired end use. Most beneficially, the vehicle will comprise about 20 to about 30% by weight of the overall non-toxic paint composition; the kaolin slurry will comprise about 5 to about 15% by weight of the overall non-toxic paint composition; and the pigment dispersion will comprise about 60 to about 70% by weight of the overall non-toxic paint composition. Notwithstanding these recommended weight percentages, the three main components may be mixed at any ratio suitable for forming a homogeneous non-toxic paint composition. For instance, if additional components are added to the composition, these ratios suggested above may not be the most beneficial. One of ordinary skill in the art with the benefit of this disclosure will recognize the adjustments in the ratios of the components that need to be made to achieve desired end-results.

The following is a nonlimiting example of the ratios of the various components used to form a homogeneous non-toxic paint composition:

Vehicle 25% by weight,

Kaolin Slurry 10% by weight, and

Pigment Dispersion 65% by weight.

The examples and descriptions listed below discuss specific characteristics of one embodiment of the non-toxic paints of the present invention; however, they must be regarded as nonlimiting embodiments of the possible formulations of all of the non-toxic paints of the present invention. Specifically, these should not be read to exclude extrapolation of these examples to large, commercial operations for producing the non-toxic paints of the present invention, as these paints are suitable for commercial exploitation.

Listed below are examples of the non-toxic paints of the present invention:

White Milk Paint-
Aqueous Dispersion of Titanium Dioxide

Appearance: Liquid or Semi-Liquid
pH: 8.0–9.0
Specific gravity: 1.15
Pigment: White
Volatiles by Weight: 50–55%
Solubility in Water: Water dispersible -continued Boiling point: >100° F.
Fragrance: Optionally, vanilla.
Red Oxide Milk Paint-
Aqueous Casein Based Dispersion of Red Iron Oxide Appearance: Liquid or Semi-Liquid
pH: 8.0–9.0
Specific gravity: 1.15
Pigment: Red
Volatiles by Weight: 50–55%
Solubility in Water: Water dispersible
Boiling point: >100° F.
Fragrance: Vanilla In the examples above, any pigment may be substituted to achieve a desired color. If the other components of the non-toxic paint are used in similar ratios as those above, the resultant paint will have the same or similar characteristics, other than color and/or fragrance.

After final mixing, the following tests may be performed: viscosity, pH, final grind, sag test, weight per gallon, hide, and final color comparison with a spectrophotometer.

The present invention, therefore, is well adapted to carry out the objectives and attain both the ends and the advantages mentioned, as well as other benefits inherent therein. While the present invention has been depicted, described, and is defined by reference to particular embodiments of the invention, such references do not imply a limitation to the invention, and no such limitation is to be inferred. The invention is capable of considerable modification, alternation, alteration, and equivalents in form and/or functions, as will occur to those of ordinary skill in the pertinent arts. The depicted and described embodiments of the invention are exemplary only, and are not exhaustive of the scope of the present invention. Consequently, the present invention is intended to be limited only by the spirit and scope of the appended claims, giving full cognizance to equivalents in all respects.

What is claimed is:

1. A liquid or semi-liquid non-toxic paint comprising:
    a vehicle, the vehicle comprising potassium sorbate and casein protein;
    a kaolin slurry; and
    a pigment dispersion.

2. A non-toxic paint according to claim 1 further comprising a fragrance.

3. A non-toxic paint according to claim 1 wherein the vehicle further comprises water, methyl-2-amino-2-propanol-1, and urea.

4. A non-toxic paint according to claim 1 wherein the kaolin slurry further comprises potassium sorbate.

5. A non-toxic paint according to claim 4 wherein the kaolin slurry further comprises methyl-2-amino-2-propanol-1 and water.

6. A non-toxic paint according to claim 1 wherein the pigment dispersion comprises titanium dioxide.

7. A non-toxic paint according to claim 1 wherein the pigment dispersion further comprises potassium sorbate.

8. A non-toxic paint according to claim 1 wherein the pigment dispersion further comprises calcium carbonate and water.

9. A non-toxic paint according to claim 1 wherein the pigment dispersion, the kaolin slurry, or the vehicle further comprises a pigment.

10. A non-toxic paint according to claim 9 wherein the pigment is selected from the group consisting of organic pigments, inorganic pigments, vegetable dyes and other naturally occurring earth pigments.

11. A non-toxic paint according to claim 9 further comprising a pigment selected from the group consisting of indigo, ocher, umber, carbon black and an iron oxide.

12. A non-toxic paint according to claim 1 wherein 20 to about 30% of said non-toxic paint is said vehicle.

13. A non-toxic paint according to claim 1 wherein 5 to about 15% of said non-toxic paint is said kaolin slurry.

14. A non-toxic paint according to claim 1 wherein 60 to about 70% of said non-toxic paint is said pigment dispersion.

15. A method of manufacturing a liquid or semi-liquid non-toxic paint comprising the steps of:
   providing a vehicle, the vehicle comprising casein and potassium sorbate;
   providing a kaolin slurry;
   providing a pigment dispersion; and
   mixing the vehicle, the kaolin slurry, and the pigment dispersion so as to form a liquid or semi-liquid non-toxic paint.

16. A liquid or semi-liquid non-toxic paint made according to the method of claim 15.

17. A method of manufacturing a vehicle for use in formulating a liquid or semi-liquid non-toxic paint comprising the steps of:
   providing potassium sorbate;
   providing casein protein;
   providing methyl-2-amino-2-propanol-1;
   providing water;
   providing urea; and
   mixing the potassium sorbate, casein protein, methyl-2-amino-2-propanol-1, water and the urea so as to form a liquid or semi-liquid vehicle.

18. A vehicle for use in formulating a non-toxic paint made according to the method of claim 17.

19. A method of manufacturing a kaolin slurry for use in formulating a liquid or semi-liquid non-toxic paint comprising the steps of:
   providing kaolin;
   providing potassium sorbate;
   providing methyl-2-amino-2-propanol-1;
   providing a vehicle, said vehicle comprising casein protein;
   providing water; and
   mixing the kaolin, potassium sorbate, methyl-2-amino-2-propanol-1, the casein protein of said vehicle, and water so as to form a liquid or semi-liquid kaolin slurry.

20. A kaolin slurry for use in formulating a non-toxic paint made according to the method of claim 19.

21. A method of making a pigment dispersion for use in formulating a liquid or semi-liquid non-toxic paint comprising the steps of:
   providing titanium dioxide;
   providing a vehicle, the vehicle comprising casein protein;
   providing water;
   providing calcium carbonate;
   providing potassium sorbate; and
   mixing the titanium dioxide, calcium carbonate, the casein protein of said vehicle, the water, and the potassium sorbate so as to form a liquid or semi-liquid pigment dispersion.

22. A method of making a pigment dispersion according to claim 21 further comprising the steps of;
   providing a pigment; and
   mixing the pigment and the titanium dioxide, calcium carbonate, the casein protein of the vehicle, the water, and the potassium sorbate to form a liquid or semi-liquid pigment dispersion.

23. A pigment dispersion for use in formulating a non-toxic paint made according to claim 22.

* * * * *